United States Patent [19]

Hormadaly

[11] Patent Number: 4,707,346

[45] Date of Patent: Nov. 17, 1987

[54] METHOD FOR DOPING TIN OXIDE

[75] Inventor: Jacob Hormadaly, Wilmington, Del.

[73] Assignee: E. I. Du Pont de Nemours and Company, Wilmington, Del.

[21] Appl. No.: 854,116

[22] Filed: Apr. 21, 1986

Related U.S. Application Data

[60] Division of Ser. No. 770,518, Aug. 29, 1985, Pat. No. 4,613,539, which is a division of Ser. No. 460,572, Jan. 24, 1983, Pat. No. 4,548,741, which is a continuation-in-part of Ser. No. 383,452, Jun. 1, 1982, abandoned.

[51] Int. Cl.[4] .......................... C01F 11/00; H01B 1/06

[52] U.S. Cl. ...................................... 423/518; 252/518

[58] Field of Search ................ 423/593; 252/518–521; 427/101, 102, 126.1, 126.2, 126.3, 376.2, 375, 210; 29/610 R, 620; 338/20, 308, 309; 501/55, 157, 58, 59, 77, 65–68; 106/1–22

[56] References Cited

U.S. PATENT DOCUMENTS

| | | | |
|---|---|---|---|
| 2,490,825 | 12/1949 | Mochel | 106/55 |
| 3,486,931 | 12/1969 | Dreyfus | 427/101 |
| 3,974,107 | 8/1976 | Carcia | 252/520 |
| 4,129,525 | 12/1978 | Horowitz et al. | 252/518 |
| 4,163,706 | 8/1979 | Horowitz et al. | 252/518 |
| 4,176,094 | 11/1979 | Horowitz et al. | 252/518 |
| 4,302,362 | 11/1981 | Hoffman et al. | 252/520 |
| 4,476,039 | 10/1984 | Hormadaly | 252/519 |

FOREIGN PATENT DOCUMENTS

| | | |
|---|---|---|
| 1063796 | 10/1979 | Canada . |
| 1665826 | 2/1977 | Fed. Rep. of Germany . |

OTHER PUBLICATIONS

Binns, D. B. Transactions of the British Ceramic Society, Jan. 1974, vol. 73, pp. 7–17.

*Primary Examiner*—Josephine L. Barr

[57] ABSTRACT

The invention is directed primarily to a method of doping tin oxide with $Ta_2O_5$ and/or $Nb_2O_5$ using pyrochlore-related compounds derived from the system $SnO—SnO_2—Ta_2O_5—Nb_2O_5$ for use in thick film resistor compositions. The invention is also directed to thick film resistors containing the above-described pyrochlore-related compounds and to various compositions and methods for making such thick film resistors.

1 Claim, No Drawings

METHOD FOR DOPING TIN OXIDE

CROSS REFERENCE TO PRIOR APPLICATION

This is a division of application Ser. No. 770,518 filed Aug. 29, 1985, now U.S. Pat. No. 4,613,539, which is a division of application Ser. No. 460,572 filed Jan. 24, 1983, now U.S. Pat. No. 4,548,741 which is a continuation-in-part of application Ser. No. 383,452 filed June 1, 1982, now abandoned.

FIELD OF THE INVENTION

The invention is directed to a method for doping tin oxide and, more specifically, to application of the method for making tin pyrochlore-related compounds for use in thick film resistors.

BACKGROUND OF THE INVENTION

Thick film materials are mixtures of metal, glass and/or ceramic powders dispersed in an organic medium. These materials, which are applied to nonconductive substrates to form conductive, resistive or insulating films, are used in a wide variety of electronic and light electrical components.

The properties of such thick film compositions depend on the specific constituents of the compositions. Most of such thick film compositions contain three major components. A conductive phase determines the electrical properties and influences the mechanical properties of the final film. A binder, usually a glass and/or crystalline oxide, holds the thick film together and bonds it to a substrate and an organic medium (vehicle) acts as a dispersing medium and influences the application characteristics of the composition and particularly its rheology.

High stability and low process sensitivity are critical requirements for thick film resistors in microcircuit applications. In particular, it is necessary that resistivity ($R_{av}$) of a resistor be stable over a wide range of temperature conditions. Thus, the thermal coefficient of resistance (TCR) is a critical variable in any thick film resistor. Because thick film resistor compositions are comprised of a functional (conductive) phase and a permanent binder phase, the properties of the conductive and binder phases and their interactions with each other and with the substrate affect both resistivity and TCR.

Heretofore, thick film resistor compositions have usually had a functional phase consisting of noble metal oxides and polyoxides and occasionally base metal oxides and derivatives thereof. However, these materials have had a number of shortcomings when compounded to produce a high resistance film. For example, the noble metals when formulated to obtain suitably low TCR have very poor power handling characteristics. On the other hand, when they are formulated to give good power handling characteristics, the TCR is too negative. Furthermore, when metal oxides such as $RuO_2$ and polyoxides such as ruthenium pyrochlore are used as the conductive phase for resistors, they must be air-fired. Consequently, they cannot be used with more economical base metal terminations. Still further, when base materials such as metal hexaborides are used, it has not been possible to formulate them to obtain high resistance values (e.g., $\geqq 30\ k\Omega/\square$) without degrading their power handling ability.

Among the base-metal materials which have been investigated for use in resistors are tin oxide ($SnO_2$) doped with other metal oxides such as $As_2O_3$, $Ta_2O_5$, $Sb_2O_5$ and $Bi_2O_3$. These materials are disclosed in U.S. Pat. No. 2,490,825 to Mochell and also by D. B. Binns in transactions of the British Ceramic Society, January, 1974, volume 73, pp. 7–17. However, these materials are semi-conductors, i.e., they have very highly negative TCR values. In Canadian Pat. No. 1,063,796, R. L. Whalers and K. M. Merz disclose the use of resistors based upon $SnO_2$ and $Ta_2O_5$ which have very highly negative TCR values at high resistances. In addition, these latter materials require processing temperatures of at least 1,000° C.

Despite the many advances in the resistor art, there exists a strongly unmet need for economical resistor materials which will give small negative TCR values and preferably even slightly positive TCR values in the range of 30 $k\Omega/\square$ to 30 $M\Omega/\square$. Such materials are especially needed for both medical instrumentation and for high reliability electronic network applications.

SUMMARY OF THE INVENTION

The invention is directed primarily to methods of doping tin oxide with tantalum and/or niobium using pyrochlore-related compounds derived from the system $SnO$—$SnO_2$—$Ta_2O_5$—$Nb_2O_5$ and to the application of these doped pyrochlore-related compounds to produce thick film resistors having quite desirably low TCR values.

Therefore, in its first aspect, the invention is directed to a method of doping tin oxide to form a pyrochlore corresponding to the formula $$Sn_{2-x}^{2+}Ta_{y3}Nb_{y2}Sn_{y1}^{4+}O_{7-x-y1/2}$$

wherein $x=0$–$0.55$
$y_3=0$–$2$
$y_2=0$–$2$
$y_1=0$–$0.5$ and $$y_1+y_2+y_3=2,$$

which comprises firing in a nonoxidizing atmosphere an admixture of finely divided particles of $SnO$, $SnO_2$ and a metal pentoxide selected from the group consisting of $Ta_2O_5$, $Nb_2O_5$ and mixtures thereof, at a temperature of at least 500° C.

In a second aspect, the invention is directed to a method for making a conductive phase for resistors containing the above-described pyrochlore which comprises firing in a nonoxidizing atmosphere an admixture of finely divided particles of $SnO$, $SnO_2$ and metal pentoxide selected from the group consisting of $Ta_2O_5$, $Nb_2O_5$ and mixtures thereof at a temperature of at least 900° C., the mole ratio of $SnO$ to metal pentoxide being 1.4–3.0, the $SnO_2$ being in stoichiometric excess of the $SnO$ and metal pentoxide and comprising 20–95% by weight of the total oxides.

In a third aspect, the invention is directed to another method for making a conductive phase for resistors containing the above-described pyrochlore which comprises firing in a nonoxidizing atmosphere an admixture of finely divided particles of $SnO_2$ and a pyrochlore corresponding to the formula $$Sn_{2-x}^{2+}Ta_{y3}Nb_{y2}Sn_{y1}^{4+}O_{7-x-y1/2}$$

wherein $x=0$–$0.55$
$y_3=0$–$2$ $y_2=0$–$2$
$y_1=0$–$0.5$ and $$y_1+y_2+y_3=2,$$

the amount of $SnO_2$ being from 20 to 95% by weight of the admixture.

In a fourth aspect, the invention is directed to the method of making resistor elements containing the above-described pyrochlore compounds by (a) forming a dispersion in organic medium of finely divided particles of SnO, $SnO_2$, a metal pentoxide selected from the group consisting of $Ta_2O_5$, $Nb_2O_5$ and mixtures thereof, and inorganic binder having a sintering temperature of below 900° C., the mole ratio of SnO to metal pentoxide being 1.4–3.0, the $SnO_2$ being in stoichiometric excess of the SnO and metal pentoxide and comprising 20–95% by weight of the total oxides and the inorganic binder comprising 5–45% by weight of the solids content of the dispersion;

(b) forming a patterned thin layer of the dispersion of step (a);

(c) drying the layer of step (b); and (d) firing the dried layer of step (c) in a nonoxidizing atmosphere to effect volatilization of the organic medium and liquid phase sintering of the inorganic binder.

In a fifth aspect, the invention is directed to another method of making resistor elements containing the above-described pyrochlores using a conductive phase as described above by (a) forming a dispersion in organic medium of finely divided particles of conductive phase made by the method of claim 2 and/or claim 3 or mixtures thereof and inorganic binder, the inorganic binder being from 5 to 45% wt. of the solids content of the dispersion;

(b) forming a patterned thin layer of the dispersion of step (a);

(c) drying the layer of step (b); and (d) firing the dried layer of step (c) in a nonoxidizing atmosphere to effect volatilization of the organic medium and liquid phase sintering of the inorganic binder.

In a sixth aspect, the invention is directed to yet another method of making resistor elements from the above-described pyrochlore and $SnO_2$.

In a seventh aspect, the invention is directed to a screen-printable thick film resistor composition comprising a dispersion in organic medium of finely divided particles of SnO, $SnO_2$, a metal pentoxide selected from the group consisting of $Ta_2O_5$, $Nb_2O_5$ and mixtures thereof, and inorganic binder having a sintering temperature of below 900° C., the mole ratio of SnO to metal pentoxide being 1.4–3.0, the $SnO_2$ being in stoichiometric excess of the SnO and metal pentoxide and comprising 5–95% by weight of the total oxides.

In an eighth aspect, the invention is directed to a screen-printable thick film resistor composition comprising a dispersion in organic medium of finely divided particles of an admixture of conductive phase made by the method of either claim 2 or 3 or mixtures thereof and inorganic binder, the inorganic binder being from 5 to 45% wt. of the solids content of the dispersion.

In a ninth aspect, the invention is directed to a screen-printable thick film resistor composition comprising a dispersion in organic medium of an admixture of finely divided particles of a pyrochlore corresponding to the formula $$Sn_{2-x}^{2+}Ta_{y3}Nb_{y2}Sn_{y1}^{4+}O_{7-x-y1/2}$$

wherein
$x=0$–$0.55$
$y_3=0$–$2$
$y_2=0$–$2$
$y_1=0$–$0.5$ and $$y_1+y_2+y_3=2,$$

20 to 95% wt. $SnO_2$, basis pyrochlore and $SnO_2$, and inorganic binder, the inorganic binder being from 5 to 45% wt. of the solids content of the dispersion.

In a last aspect, the invention is directed to a resistor comprising a patterned thin layer of the dispersion of any of the above-described compositions or mixtures thereof which has been dried and fired in a nonoxidizing atmosphere to effect volatilization of the organic medium and liquid phase sintering of the inorganic binder.

DETAILED DESCRIPTION OF THE INVENTION

A. Pyrochlore Component

It is clear from X-ray analysis that the above-described compounds derived from the system $SnO—SnO_2—Ta_2O_5—Nb_2O_5$ have pyrochlore-related structures. However, the precise nature of that pyrochlore-related structure has not been determined. Nevertheless, for purposes of convenience in referring to them, the terms "pyrochlore" and "pyrochlore-related compounds" are used interchangeably.

Whether it is desired to make the above-described pyrochlore separately for addition to thick film resistor compositions or to make them directly as a component of a conductive phase or a fully formed resistor material, it is preferred that each of the metal oxides used be of high purity to assure practically complete absence of chemical side reactions which might adversely affect resistor properties under various operating conditions, especially TCR. The metal oxides are typically of at least 99% wt. purity and preferably 99.5% wt. or even higher purity. Purity is especially a critical factor in the case of the $SnO_2$.

Particle size of the pyrochlore components, i.e., SnO, $SnO_2$, $Ta_2O_5$ and/or $Nb_2O_5$, is not highly critical from the standpoint of their technical effectiveness in making the pyrochlore. However, it is preferred that they be finely divided to facilitate thorough mixing and complete reaction. A particle size of 0.1 to 80 μm is normally preferred, with a particle size of 10 to 40 μm being especially suitable.

The pyrochlore-related compounds (pyrochlores) themselves are prepared by firing the admixture of finely divided particles of SnO, $SnO_2$ and metal pentoxide at 500° to 1100° C. in a nonoxidizing atmosphere. A firing temperature of 700°–1000° C. is preferred.

A conductive phase suitable for the preparation of thick film resistors which contains the above-described pyrochlore can be made by two basic methods. In the first, 5–95% wt. of the powdered pyrochlore is mixed with 95–5% wt. of powdered $SnO_2$ and the admixture is fired to produce a conductive phase. From 20–95% wt. of pyrochlore is preferred.

In the second method for making the conductive phase, an admixture of finely divided SnO, $SnO_2$ and metal pentoxide is formed in which the mole ratio of SnO to metal pentoxide is 1.4–3.0 and the $SnO_2$ is in stoichiometric excess of SnO and metal pentoxide. The $SnO_2$ comprises 5–95% by wt. of the total oxides. This admixture is then fired at 600°–1100° C. by which the pyrochlore is formed as one solid phase and excess $SnO_2$ comprises the second phase of the fired reaction product. As in the case of making the pyrochlore by itself, the preferred firing temperature is 600°–1000° C.

The conductive phases made in these ways can be combined with inorganic binder and organic medium to form a screen-printable thick film composition. In some instances, it may be desirable to add $SnO_2$ to the composition to change the level of resistivity or to change the temperature coefficient of resistance. This can, however, also be done by changing the composition of the inorganic binder to be used.

B. Inorganic Binder

Glass is most frequently used as inorganic binder for resistors containing the above-described pyrochlores and can be virtually any lead-, cadmium-, or bismuth-free glass composition having a melting point of below 900° C. Preferred glass frits are the borosilicate frits, such as barium, calcium or other alkaline earth borosilicate frits. The preparation of such glass frits is well-known and consists, for example, in melting together the constituents of the glass in the form of the oxides of the constituents and pouring such molten composition into water to form the frit. The batch ingredients may, of course, be any compound that will yield the desired oxides under the usual conditions of frit production. For example, boric oxide will be obtained from boric acid; silicon dioxide will be produced from flint; barium oxide will be produced from barium carbonate; etc. The glass is preferably milled in a ball mill with water to reduce the particle size of the frit and to obtain a frit of substantially uniform size.

Particularly preferred glass frits for use in the resistor compositions of the invention are those Bi-, Cd- and Pb-free frits comprising by mole % 10–50% $SiO_2$, 20–60% $B_2O_3$, 10–35% BaO, 0–20% CaO, 0–15% MgO, 0–15% NiO, 0–15% $Al_2O_3$, 0–5% $SnO_2$, 0–7% $ZrO_2$ and 0–5% of a metal fluoride in which the metal is selected from the group consisting of alkali metals, alkaline earth metals and nickel, the mole ratio $B_2O_3+Al_2O_3/SiO_2+SnO_2+ZnO_2$ is 0.8–4, the total of BaO, CaO, MgO, NiO and $CaF_2$ is 5–50 mole %, and the total of $Al_2O_3$, $B_2O_3$, $SiO_2$, $SnO_2$ and $ZrO_2$ is 50–85 mole % (preferably 60–85 mole %). Such glasses are particularly desirable because in combination with the above-described pyrochlores, they yield very highly positive hot TCR's at high resistance levels.

The glasses are prepared by conventional glass-making techniques by mixing the desired components in the desired proportions and heating the mixture to form a melt. As is well known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. The melt is heated at a peak temperature of 1100°–1400° C. for a period of 1–1½ hours. The melt is then poured into cold water. The maximum temperature of the water during quenching is kept as low as possible by increasing the volume of water to melt ratio. The crude frit after separation from water is freed from residual water by drying in air or by displacing the water by rinsing with methanol. The crude frit is then ball milled for 3–15 hours in alumina containers using alumina balls. Alumina picked up by the materials, if any, is not within the observable limit as measured by X-ray diffraction analysis.

After discharging the milled frit slurry from the mill, excess solvent is removed by decantation and the frit powder is air-dried at room temperature. The dried powder is then screened through a 325 mesh screen to remove any large particles.

The major two properties of the frit are that it aids the liquid phase sintering of the inorganic crystalline particulate materials and forms noncrystalline (amorphous) or crystalline materials by devitrification during the heating-cooling cycle (firing cycle) in the preparation of thick film resistors. This devitrification process can yield either a single crystalline phase having the same composition as the precursor noncrystalline (glassy) material or multiple crystalline phases with different compositions from that of the precursor glassy material.

A particularly preferred binder composition for the pyrochlore-containing resistors of the invention is comprised of 95–99.9% by weight of the above-described bismuth-, cadmium- and lead-free glass and 5–0.1% wt. of a metal fluoride selected from the group consisting of $CaF_2$, $BaF_2$, $MgF_2$, $SrF_2$, NaF, LiF, KF and $NiF_2$. The use of such metal fluorides with the frit produces a decrease in resistance of the resistors made therefrom.

C. Organic Medium

The main purpose of the organic medium is to serve as a vehicle for dispersion of the finely-divided solids of the composition in such form that it can readily be applied to a ceramic or other substrate. Thus, the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of inert liquids can be used as organic medium. The organic medium for most thick film compositions is typically a solution of resin in a solvent and frequently a solvent solution containing both resin and thixotropic agent. The solvent usually boils within the range of 130°–350° C.

By far, the most frequently used resin for this purpose is ethyl cellulose. However, resins such as ethylhydroxyethyl cellulose, wood rosin, mixtures of ethyl cellulose and phenolic resins, polymethacrylates of lower alcohols, and monobutyl ether of ethylene glycol monoacetate can also be used.

The most widely used solvents for thick film applications are terpenes such as alpha- or beta-terpineol or mixtures thereof with other solvents such as kerosene, dibutylphthalate, butyl carbitol, butyl carbitol acetate, hexylene glycol, and high boiling alcohols and alcohol esters. Various combinations of these and other solvents are formulated to obtain the desired viscosity and volatility requirements for each application.

Among the thixotropic agents which are commonly used are hydrogenated castor oil and derivatives thereof and ethyl cellulose. It is, of course, not always necessary to incorporate a thixotropic agent since the solvent/resin properties coupled with the shear thinning inherent in any suspension may alone be suitable in this regard.

The ratio of organic medium to solids in the dispersions can vary considerably and depends upon the manner in which the dispersion is to be applied and the kind of organic medium used. Normally, to achieve good coverage the dispersions will contain complementally by weight 60-90% solids and 40-10% organic medium. Such dispersions are usually of semifluid consistency and are referred to commonly as "pastes".

Pastes are conveniently prepared on a three-roll mill. The viscosity of the pastes is typically within the following ranges when measured at room temperature on Brookfield viscometers at low, moderate and high shear rates:

| Shear Rate ($Sec^{-1}$) | Viscosity (Pa.S) | |
|---|---|---|
| 0.2 | 100-5000 | — |
| | 300-2000 | Preferred |
| | 600-1500 | Most preferred |
| 4 | 40-400 | — |
| | 100-250 | Preferred |
| | 140-200 | Most preferred |
| 384 | 7-40 | — |
| | 10-25 | Preferred |
| | 12-18 | Most preferred |

The amount and type of organic medium (vehicle) utilized is determined mainly by the final desired formulation viscosity and print thickness.

Formulation and Application

In the preparation of the composition of the present invention, the particulate inorganic solids are mixed with the organic medium and dispersed with suitable equipment such as a three-roll mill to form a suspension, resulting in a composition for which the viscosity will be in the range of about 100-150 Pa.S at a shear rate of 4 $sec^{-1}$.

In the examples which follow, the formulation was carried out in the following manner:

The ingredients of the paste, minus about 5% wt. of the estimated organic components which will be required are weighed together in a container. The components are then vigorously mixed to form a uniform blend; then the blend is passed through dispersing equipment such as a three-roll mill to achieve a good dispersion of particles. A Hegman gauge is used to determine the state of dispersion of the particles in the paste. This instrument consists of a channel in a block of steel that is 25 μm deep (1 mil) on one end and ramps up to 0" depth at the other end. A blade is used to draw down paste along the length of the channel. Scratches will appear in the channel where the agglomerates' diameter is greater than the channel depth. A satisfactory dispersion will give a fourth scratch point of 10-18 μm typically. The point at which half of the channel is uncovered with a well dispersed paste is between 3 and 8 μm typically. Fourth scratch measurement of 20 μm and "half-channel" measurements of 10 μm indicate a poorly dispersed suspension.

The remaining 5% of the organic components of the paste is then added and the resin content of the paste is adjusted to bring the viscosity when fully formulated to between 140 and 200 Pa.S at a shear rate of 4 $sec^{-1}$.

The composition is then applied to a substrate such as alumina ceramic, usually by the process of screen printing, to a wet thickness of about 30-80 microns, preferably 35-70 microns and most preferably 40-50 microns. The electrode compositions of this invention can be printed onto the substrates either by using an automatic printer or a hand printer in the conventional manner. Preferably automatic screen stencil techniques are employed using a 200 to 325 mesh screen. The printed pattern is then dried at below 200° C., e.g., about 150° C., for about 5-15 minutes before firing. Firing to effect sintering of both the inorganic binder and the finely divided particles of metal is preferably done in a well ventilated belt conveyor furnace with a temperature profile that will allow burnout of the organic matter at about 300°-600° C., a period of maximum temperature of about 800°-950° C. lasting about 5-15 minutes, followed by a controlled cooldown cycle to prevent oversintering, unwanted chemical reactions at intermediate temperatures or substrate fracture which can occur from too rapid cooldown. The overall firing procedure will preferably extend over a period of about 1 hour, with 20-25 minutes to reach the firing temperature, about 10 minutes at the firing temperature and about 20-25 minutes in cooldown. In some instances, total cycle times as short as 30 minutes can be used.

Sample Preparation

Samples to be tested for temperature coefficient of resistance (TCR) are prepared as follows:

A pattern of the resistor formulation to be tested is screen printed upon each of ten coded Alsimag 614 1×1" ceramic substrates and allowed to equilibrate at room temperature and then dried at 150° C. The mean thickness of each set of ten dried films before firing must be 22-28 microns as measured by a Brush Surfanalyzer. The dried and printed substrate is then fired for about 60 minutes using a cycle of heating at 35° C. per minute to 850° C., dwell at 850° C. for 9 to 10 minutes and cooled at a rate of 30° C. per minute to ambient temperature.

Resistance Measurement and Calculations

Substrates prepared as described above are mounted on terminal posts within a controlled temperature chamber and electrically connected to a digital ohmmeter. The temperature in the chamber is adjusted to 25° C. and allowed to equilibrate, after which the resistance of each substrate is measured and recorded.

The temperature of the chamber is then raised to 125° C. and allowed to equilibrate, after which the resistance of the substrate is again measured and recorded.

The temperature of the chamber is then cooled to −55° C. and allowed to equilibrate and the cold resistance measured and recorded.

The hot and cold temperature coefficients of resistance (TCR) are calculated as follows:

$$\text{Hot } TCR = \frac{R_{125^\circ C.} - R_{25^\circ C.}}{R_{25^\circ C.}} \times (10{,}000) \text{ ppm/}^\circ\text{C.}$$

$$\text{Cold } TCR = \frac{R_{-55^\circ C.} - R_{25^\circ C.}}{R_{25^\circ C.}} \times (-12{,}500) \text{ ppm/}^\circ\text{C.}$$

The values of $R_{25^\circ C.}$ and Hot and Cold TCR are averaged and $R_{25^\circ C.}$ values are normalized to 25 microns dry printed thickness and resistivity is reported as ohms per square at 25 microns dry print thickness. Normalization of the multiple test values is calculated with the following relationship:

Normalized Resistance =

$$\frac{\text{Avg. measured resistance} \times \text{Avg. dry print thickness, microns}}{25 \text{ microns}}$$

Laser Trim Stability

Laser trimming of thick film resistors is an important technique for the production of hybrid microelectronic circuits. [A discussion can be found in *Thick Film Hybrid Microcircuit Technology* by D. W. Hamer and J. V. Biggers (Wiley, 1972) 173ff.] Its use can be understood by considering that the resistances of a particular resistor printed with the same resistive ink on a group of substrates has a Gaussian-like distribution. To make all the resistors have the same design value for proper circuit performance, a laser is used to trim resistances up by removing (vaporizing) a small portion of the resistor material. The stability of the trimmed resistor is then a measure of the fractional change (drift) in resistance that occurs after laser trimming. Low resistance drift—high stability—is necessary so that the resistance remains close to its design value for proper circuit performance.

Coefficient of Variance

The coefficient of variance (CV) is a function of the average and individual resistances for the resistors tested and is represented by the relationship $\sigma/R_{av}$, wherein $$\sigma = \sqrt{\frac{\Sigma_i(R_i - R_{av})^2}{n-1}}$$

$R_i$=measured resistance of individual sample.

$R_{av}$=calculated average resistance of all samples ($\Sigma_i R_i/n$)

n=number of samples

CV=$\Sigma/R \times 100$ (%)

EXAMPLES

In the Examples which follow, a variety of cadmium-, bismuth- and lead-free glass frits was used, the compositions of which are given in Table 1 below. For purposes of identification in the Examples which follow, the below listed glasses are designated by Roman numerals.

TABLE 1

| | Glass Compositions (mole %) | | | | | | | | | |
|---|---|---|---|---|---|---|---|---|---|---|
| | Glass No. | | | | | | | | | |
| Component | I | II | III | IV | V | VI | VII | VIII | IX | X |
| BaO | 20.0 | 20.0 | 20.0 | 20.0 | 20.0 | 20.0 | 20.0 | 18.31 | 18.5 | 18.5 |
| CaO | — | — | — | — | — | — | — | 9.52 | 5.0 | 5.0 |
| MgO | 5.0 | 10.0 | 10.0 | 5.0 | — | 10.0 | 10.0 | — | 6.5 | 6.5 |
| NiO | — | — | — | 5.0 | 10.0 | — | — | — | — | — |
| $Al_2O_3$ | 5.0 | — | — | — | — | — | — | — | — | — |
| $B_2O_3$ | 55.0 | 45.0 | 45.0 | 45.0 | 45.0 | 45.0 | 45.0 | 37.09 | 40.0 | 42.0 |
| $SiO_2$ | 15.0 | 20.0 | 23.0 | 23.0 | 23.0 | 25.0 | 23.0 | 32.56 | 27.0 | 25.0 |
| $SnO_2$ | — | — | — | — | — | — | — | 2.51 | 2.0 | 2.0 |
| $ZrO_2$ | — | 5.0 | 2.0 | 2.0 | 2.0 | — | 1.0 | — | 1.0 | 1.0 |
| $CaF_2$ | — | — | — | — | — | — | 1.0 | — | | — |

EXAMPLE 1

Pyrochlore Preparation: A tantalum-doped tin pyrochlore composition corresponding to the formula $Sn_{1.75}{}^{2+}Ta_{1.75}Sn_{0.25}{}^{4+}O_{6.625}$ was prepared in accordance with the first aspect of the invention as follows:

Two batches of 200 g each were prepared by ball milling 71.42 g of SnO, 117.16 g of $Ta_2O_5$ and 11.42 g of $SnO_2$ using water as a dispersing medium. Upon completion of thorough mixing, the admixtures were dried and placed into alumina crucibles and heated in a furnace containing a nonoxidizing ($N_2$) atmosphere. The mixtures were initially heated for 24 hours at 600° C. and then for 24 additional hours at 900° C. The mixtures were not ground or otherwise treated between firings.

EXAMPLE 2

Conductive Phase Preparation: The pyrochlore made by the procedure of Example 1 was then used to make a conductive phase for resistors in accordance with the third aspect of the invention as follows:

Two separate quantities, each containing 100 g of the pyrochlore of Example 1 and 400 g of purified $SnO_2$, were ball milled for one hour using isopropyl alcohol as a liquid milling medium. Upon completion of ball mill mixing, the mixtures of pyrochlore and $SnO_2$ were placed in a nitrogen furnace and fired for 24 hours at 900° C.±10° C. After firing and cooling, the powders were each Y-milled for 8 hours using isopropyl alcohol as liquid milling medium in an amount of 500 g per 2 kg of solids. The powders were placed in a vented hood and allowed to dry by evaporation to the atmosphere at room temperature (about 20° C.).

EXAMPLE 3

Conductive Phase Preparation: The pyrochlore made by the procedure of Example 1 was used to make a further conductive phase for resistors in accordance with the third aspect of the invention as follows:

An amount of the pyrochlore of Example 1 equivalent to 20% by wt. was mixed with 80% by wt. $SnO_2$ in a ball mill using isopropyl alochol as liquid milling medium. The resulting admixture was dried and then heated for 13 hours at 600° C. in a nitrogen furnace. The fired admixture was then cooled, reground by milling and reheated for 24 hours at 900° C. The final product of the heating was then subjected to further milling in isopropyl alcohol to reduce particle size further and to increase surface area.

EXAMPLES 4–11

Preparation of Thick Film Composition: A series of eight screen-printable thick film pastes was formulated by dispersing an admixture of the paste solids described in Table 2 below into 24% by wt. organic medium in the manner described hereinabove.

Evaluation of Compositions: Each of the eiqht thick film pastes was used to form a resistor film in the manner described above and the fired films were evaluated with respect to average resistance ($R_{av}$), coefficent of variance (CV) and hot temperature coefficient of resistance (HTCR). The composition of the resistor pastes and the electrical properties of the resistors formed therefrom are given in Table 2 below:

TABLE 2

| | SnO Compositional Effects | | | | | | | |
|---|---|---|---|---|---|---|---|---|
| | EXAMPLE NO. | | | | | | | |
| | 4 | 5 | 6 | 7 | 8 | 9 | 10 | 11 |
| Component | | | | | | | | |
| SnO | 1.18 | 2.50 | 5.00 | 7.50 | 3.68 | 6.70 | 6.70 | 5.86 |
| $Ta_2O_5$ | 2.11 | 4.08 | 8.16 | 12.24 | 12.24 | 10.75 | 10.75 | 9.64 |
| $SnO_2$ | 66.45 | 63.16 | 56.58 | 50.00 | 53.82 | 55.45 | 55.45 | 48.79 |
| Glass I | — | — | — | — | — | — | 27.09 | — |
| Glass II | — | — | — | — | — | 27.09 | — | — |
| Glass III | — | — | — | — | — | — | — | 31.50 |
| Glass IV | 2.63 | 2.63 | 2.63 | 2.63 | 2.63 | — | — | 3.50 |
| Glass VIII | 26.32 | 26.32 | 26.32 | 26.32 | 26.32 | — | — | — |
| $CaF_2$ | 1.32 | 1.32 | 1.32 | 1.32 | 1.32 | — | — | 0.71 |
| Resistor Properties | | | | | | | | |
| $R_{av}$ (kΩ/□) | 191.5 | 27.1 | 43.3 | 102.1 | 80.3 | 729.7 | 148.9 | 20,430 |
| CV (%) | 99.7 | 4.2 | 4.4 | 4.2 | 4.5 | 10.8 | 7.2 | 11.0 |
| HTCR (ppm/°C.) | −4254 | −282 | −200 | −222 | −177 | +57.1 | +70.4 | −47.8 |

The data in Table 2 illustrate the role of higher amounts of $Ta_2O_5$ in increasing resistance and also the use of higher ratios of glass to obtain resistances in excess of 1MΩ/□. The data also show the role of different glass compositions to obtain less negative HTCR values and, in fact, positive HTCR values as well. In effect, the compositions and methods of this example can be used to control resistance throughout the range of 20 kΩ/□ to 20MΩ/□ by increasing the amount of pyrochlore or glass and/or by using a different glass.

EXAMPLES 12-19

Preparation of Thick Film Compositions: A series of eight screen-printable thick film pastes was formulated by dispersing an admixture of various amounts of the solids described in Table 3 below in 24% by wt. organic medium in the manner described hereinabove.

Evaluation of Compositions: Each of the eight thick film compositions was used to form a series of resistor films in the manner described above and the fired films were evaluated with respect to average resistance, coefficient of variance and hot temperature coefficient of resistance. The composition of the resistor pastes and the electrical properties of the resistors formed therefrom are given in Table 3 below.

TABLE 3

| | Effect of SnO and $SnO_2$ Content on Electrical Properties of Resistors | | | | | | | |
|---|---|---|---|---|---|---|---|---|
| | EXAMPLE NO. | | | | | | | |
| | 12 | 13 | 14 | 15 (% wt. solids) | 16 | 17 | 18 | 19 |
| Component | | | | | | | | |
| SnO | — | 65.66 | 2.50 | — | 61.58 | 5.00 | — | 6.70 |
| $Ta_2O_5$ | 4.08 | 4.08 | 4.08 | 8.16 | 8.16 | 8.16 | 10.75 | 10.75 |
| $SnO_2$ | 65.66 | — | 63.16 | 61.58 | — | 56.58 | 62.15 | 55.45 |
| Glass VIII | 26.32 | 26.32 | 26.32 | 26.32 | 26.32 | 26.32 | — | — |
| Glass IV | 2.63 | 2.63 | 2.63 | 2.63 | 2.63 | 2.63 | — | — |
| Glass I | — | — | — | — | — | — | 27.09 | 27.09 |
| $CaF_2$ | 1.32 | 1.32 | 1.32 | 1.32 | 1.32 | 1.32 | | |
| Resistor Properties | | | | | | | | |
| $R_{av}$ (kΩ/□) | 1783.0 | High(1) | 27.1 | 1491.0 | High(1) | 43.3 | 702.9 | 148.9 |
| CV (%) | 78.0 | — | 4.2 | 81.4 | — | 4.4 | 188.5 | 7.2 |
| HTCR (ppm/°C.) | −6998 | — | −282 | −6708 | — | −200 | −4285 | +70 |

(1)Above 250 MΩ/□

The data from Example 12 show that SnO is an essential component of the pyrochlore portion of the resistor of the invention in that without it the resistor acquires both a highly negative HTCR and unacceptably high CV as well. On the other hand, when SnO alone is used without $SnO_2$, the resultant fired material is not a resistor but an insultor. Example 14 then illustrates that good HTCR, good CV and quite usable resistances are all obtained when the resistor is based upon both SnO and $SnO_2$.

Examples 15-17 show the same phenomena as Examples 12-14 with higher loadings of $Ta_2O_5$ in the system. Finally, Examples 18 and 19 show the use of a different glass composition at a still higher loading of $Ta_2O_5$.

EXAMPLES 20-25

Preparation of Thick Film Composition: A series of six screen-printable thick film compositions was formulated by dispersing an admixture of the pyrochlore composition of Example 1 with $SnO_2$ and inorganic binder in 24% by wt. organic medium in the manner described hereinabove. Three different glasses were employed as the inorganic binder and the pyrochlore/$SnO_2$ ratio was also varied.

Evaluation of Compositions: Each of the six thick film compositions was used to form a series of resistor films in the manner described above and the fired films were evaluated with respect to average resistance, coefficient of variance and hot temperature coefficient of resistance. The composition of the resistor pastes and the electrical properties of the resistors prepared therefrom are given in Table 4 below.

TABLE 4

SnO$_2$/Pyrochlore Compositional Effects

| | EXAMPLE NO. | | | | | |
|---|---|---|---|---|---|---|
| | 20 | 21 | 22 | 23 (% wt. solids) | 24 | 25 |
| Component | | | | | | |
| Pyrochlore[(1)] | 7.28 | 7.28 | 7.28 | 14.57 | 14.57 | 14.57 |
| SnO$_2$ | 65.56 | 65.56 | 65.56 | 58.28 | 58.28 | 58.28 |
| Glass II | 25.17 | | | 25.17 | | |
| Glass III | | 25.17 | | | 25.17 | |
| Glass VIII | — | — | 25.17 | — | — | 25.17 |
| Glass IV | 1.32 | 1.32 | 1.32 | 1.32 | 1.32 | 1.32 |
| CaF$_2$ | 0.66 | 0.66 | 0.66 | 0.66 | 0.66 | 0.66 |
| Resistor Properties | | | | | | |
| R$_{av}$ (kΩ/□) | 112.6 | 69.3 | 19.9 | 423.2 | 139.1 | 29.1 |
| CV (%) | 6.9 | 6.3 | 12.5 | 5.3 | 4.7 | 22.3 |
| HTCR (ppm/°C.) | +174 | −88 | −502 | +431 | +396 | −814 |

(1) $Sn^{2+}_{1.75}Ta_{1.75}Sn^{4+}_{0.25}O_{6.625}$

A comparison of the data of Example 17 with 20, 18 with 21 and 19 with 22 shows the effect of increasing the amount of pyrochlore to obtain higher resistance values. Theses same data also show the use of different glass compositions to control HTCR.

EXAMPLES 26–38

Preparation of Thick Film Compositions: A series of thirteen screen-printable thick film compositions was formulated by admixing the conductive phase of Example 3 with inorganic binder in 24% wt. organic medium in the manner described above. Three different glasses were used as the primary inorganic binder.

Evaluation of Compositions: Each of the thirteen thick film compositions was used to form a series of resistors in the manner described above and the fired resistor films were evaluated with respect to average resistance, coeffient of variance and hot temperature coefficient of resistance. The composition of the pastes and electrical properties of each series of resistors are given in Table 5 which follows:

TABLE 5

Effect of Glass Composition on Electrical Properties of Resistors

| | EXAMPLE NO. | | | | | | | | | | | | |
|---|---|---|---|---|---|---|---|---|---|---|---|---|---|
| | 26 | 27 | 28 | 29 | 30 | 31 | 32 | 33 (% wt. solids) | 34 | 35 | 36 | 37 | 38 |
| Component | | | | | | | | | | | | | |
| Conductive phase, Ex. 3 | 66.86 | 65.51 | 74.28 | 66.27 | 67.62 | 68.97 | 70.33 | 67.62 | 66.27 | 62.13 | 60.78 | 60.81 | 61.08 |
| Glass VIII | 29.71 | 30.93 | 23.10 | — | — | — | — | — | — | — | — | — | — |
| Glass III | — | — | — | 30.29 | 29.08 | 27.86 | 26.64 | — | — | — | — | — | — |
| Glass II | — | — | — | — | — | — | — | 29.08 | 30.29 | 34.04 | 35.25 | 36.22 | 35.95 |
| Glass IV | 3.11 | 3.24 | 2.30 | 3.11 | 2.98 | 2.84 | 2.70 | 2.98 | 3.11 | 3.51 | 3.65 | 2.97 | 2.98 |
| CaF$_2$ | 0.32 | 0.32 | 0.32 | 0.32 | 0.32 | 0.32 | 0.32 | 0.32 | 0.32 | 0.32 | 0.32 | — | |
| Resistor Properties | | | | | | | | | | | | | |
| R$_{av}$ (kΩ/□) | 68.4 | 83.7 | 44.6 | 1134.4 | 728.3 | 488.7 | 422.2 | 751.9 | 1394.3 | 7459 | 10214 | 32890 | 85140 |
| CV (%) | 4.1 | 6.0 | 3.8 | 5.2 | 10.0 | 4.7 | 7.1 | 6.8 | 9.4 | 8.4 | 9.9 | 4.8 | 9.75 |
| HTCR (ppm/°C.) | −5 | −6 | −126 | +317 | +350 | +392 | +398 | +385 | +320 | +257 | +100 | +3 | −129.5 |

Examples 26–38 illustrate quite graphically that a full range of resistors from 30 kΩ/□ to 100 MΩ/□ can be fabricated using the methods and compositions of the invention by increasing the level of pyrochlore in the conductive phase to obtain higher resistance and also by varying the composition of the inorganic binder when it is of the bismuth-, cadmium-, lead-free type.

EXAMPLES 39–45

Preparation of Thick Film Copositions: A series of screen-printable thick film compositions containing tin pyrochlore was prepared in which niobium was the dopant in place of tantalum which was used in all of the previous examples. The niobium-containing formulations were prepared by ball milling a mixture of SnO:Nb$_2$O$_5$:SnO$_2$ in molar ratios of 2:1:31.96, respectively. The ball milled mixture was dried in an atmospheric oven at 100° C.± 10° C. and then heated in a nitrogen furnace for 24 hours at 900° C. The fired product was then milled further to increase its surface area. In Examples 39–42, the above-described niobium-containing pyrochlore was the sole component of the conductive phase of the resistor. In Examples 43–45, a tantalum-based pyrochlore prepared in the same manner as the niobium-based material was used as the primary conductive phase with only a minor amount of the niobium-based material. The tantalum-based pyrochlore was prepared from an admixture of SnO:Ta$_2$O$_5$:SnO$_2$ in molar ratios of 2:1:28.65, respectively.

Evaluation of Compositions: Each of the seven thick film compositions was used to form a series of resistors in the manner described above and the fired films were evaluated with respect to average resistance, coefficient of variance and hot temperature coefficient of resistance. The compositions of the thick film pastes and electrical properties of each series of resistors are given in Table 6 below.

TABLE 6

Properties of Niobium-based Tin Pyrochlores

| | EXAMPLE NO. | | | | | | |
|---|---|---|---|---|---|---|---|
| | 39 | 40 | 41 | 42 (% wt. solids) | 43 | 44 | 45 |
| Component | | | | | | | |
| Nb-based conductive phase | 67.6 | 67.6 | 67.6 | 67.6 | 2.7 | 4.0 | 5.3 |
| Ta-based conductive phase | — | — | — | — | 65.4 | 64.1 | 62.7 |
| Glass X | 29.1 | | | | | | |

TABLE 6-continued

| Properties of Niobium-based Tin Pyrochlores | | | | | | | |
|---|---|---|---|---|---|---|---|
| | EXAMPLE NO. | | | | | | |
| | 39 | 40 | 41 | 42 | 43 | 44 | 45 |
| | (% wt. solids) | | | | | | |
| Glass VIII | | 29.1 | | | | | |
| Glass III | | | 29.1 | | 28.7 | 28.7 | 28.7 |
| Glass II | | | | 29.1 | | | |
| Glass IV | 3.0 | 3.0 | 3.0 | 3.0 | 2.9 | 2.9 | 2.9 |
| $CaF_2$ | 0.3 | 0.3 | 0.3 | 0.3 | 0.3 | 0.3 | 0.3 |
| Resistor Properties | | | | | | | |
| $R_{av}$ (kΩ/□) | 2.373 | 0.567 | 13.251 | 16.912 | 0.712 | 0.602 | 0.629 |
| CV (%) | 4.9 | 2.7 | 9.1 | 4.6 | 4.7 | 7.2 | 10.6 |
| HTCR (ppm/°C.) | −3582 | −3453 | −3559 | −3596 | +176 | +95 | +4 |

Examples 39–42 illustrate the fact that the Nb-based conductives have different electrical properties than their tantalum-based analogs; the Nb-based pyrochlore exhibits semiconducting properties as shown by the very highly negative HTCR values, while the tantalum-based pyrochlore exhibits metallic-type behavior; that is, the resistance rises as temperature is increased.

Examples 43–45 illustrate the use of the Nb-based conductives as a TCR modifier for tantalum-based thick film resistor compositions. In particular, the Nb-based materials effected a substantial change in HTCR with only slight changes in resistance values.

EXAMPLE 46

A conductive phase for resistors was made in accordance with the third aspect of the invention as follows:

An admixture of finely divided particles containing 405.7 g of $SnO_2$, 58.58 g $Ta_2O_5$ and 35.71 g SnO was prepared by ball milling for one hour using distilled water as the liquid milling medium. The milled mixture was oven dried at 120° C. The dried mixture was then placed in an alumina crucible and heated for 24 hours at 875° C. Upon completion of the heating at 875° C., the reaction mixture was Y-milled for six hours using distilled water as the liquid milling medium and then oven dried at 100° C.

The properties of the reactants in the above-described process are such that the fired product contained 20% wt. of pyrochlore having the same formula as Example 1 and 80% by wt. free $SnO_2$. This procedure, of course, avoids separate operations for synthesizing the pyrochlore and forming the conductive phase.

EXAMPLE 47–51

Preparation of Thick Film Compositions: A series of five screen-printable thick film compositions was formulated by dispersing an admixture of the solids described in Table 7 below in 26% wt. organic medium in the manner described above.

Evaluation of Compositions: Each of the five thick film compositions was used to form a resistor film in the manner described hereinabove and the fired films were evaluated with respect to average resistance, coefficient of variance and hot temperature coefficient of resistance. The compositions and their electrical properties are given in Table 7 which follows:

TABLE 7

| Conductive Phase and Glass Compositional Effects | | | | | |
|---|---|---|---|---|---|
| | EXAMPLE NO. | | | | |
| | 47 | 48 | 49 | 50 | 51 |
| | (% wt. solids) | | | | |
| Component | | | | | |
| Conductive phase, Ex. 46 | 70.33 | 67.62 | 67.62 | 70.30 | 67.62 |
| Glass III | — | — | 29.07 | — | — |
| Glass IX | 26.64 | 29.07 | — | — | — |
| Glass II | — | — | — | 26.63 | 29.07 |
| Glass IV | 2.70 | 2.97 | 2.97 | 2.70 | 2.97 |
| $CaF_2$ | 0.32 | 0.32 | 0.32 | 0.32 | 0.32 |
| Resistor Properties | | | | | |
| $R_{av}$ (kΩ/□) | 0.149 | 0.229 | 0.930 | 1.268 | 2.169 |
| CV (%) | 2.6 | 5.4 | 4.8 | 5.5 | 7.8 |
| HTCR (ppm/°C.) | +172 | +141 | +298 | +369 | +288 |

The data in Table 7 show that an increase in the concentration of the conductive phase lowers resistance and raises HTCR. The effect of the glass composition in changing both resistance and HTCR is shown by comparing Examples 48, 49 and 51 and also by comparing Examples 47 and 50. It is noteworthy that all of the CV values in the high resistance range are all well within the acceptable range, i.e., they are below about 10%.

EXAMPLES 52–56

Preparation of Thick Film Compositions: A series of five screen-printable thick film pastes was formulated by dispersing an admixture of the conductive phase of Example 2, Y-milled $SnO_2$ and inorganic binder in 26% wt. organic medium in the manner described hereinabove.

Evaluation of Compositions: Each of the five thick film pastes was used to form a resistor film in the manner described above and the fired films were evaluated with respect to average resistance, coefficient of variance and hot temperature coefficient of resistance. The composition of the resistor paste solids and the electrical resistors therefrom are given in Table 8 below.

TABLE 8

| Low-end Pyrochlore-based Resistors | | | | | |
|---|---|---|---|---|---|
| | EXAMPLE NO. | | | | |
| | 52 | 53 | 54 | 55 | 56 |
| | (% wt. solids) | | | | |
| Component | | | | | |
| Conductive phase, Ex. 2 | 33.81 | 43.95 | 50.72 | 59.51 | 67.62 |
| $SnO_2$ | 33.81 | 23.67 | 16.91 | 8.11 | — |
| Glass VIII | 29.08 | 29.08 | 29.08 | 29.08 | 29.08 |

TABLE 8-continued

| Low-end Pyrochlore-based Resistors | EXAMPLE NO. | | | | |
|---|---|---|---|---|---|
| | 52 | 53 | 54 (% wt. solids) | 55 | 56 |
| Glass IV | 2.98 | 2.98 | 2.98 | 2.98 | 2.98 |
| $CaF_2$ | 0.32 | 0.32 | 0.32 | 0.32 | 0.32 |
| Resistor Properties | | | | | |
| $R_{av}$ (kΩ/□) | 29.5 | 35.8 | 44.2 | 52.8 | 67.1 |
| CV (%) | 6.2 | 3.2 | 3.9 | 5.1 | 5.0 |
| HTCR (ppm/°C.) | −78 | +8 | +19 | +52 | +49 |

The data in Table 8 illustrate the use of the invention to make "low-end" resistors. In particular, by raising the ratio of conductive phase to $SnO_2$, the resistance values can be raised and HTCR values rendered positive. The values of CV remain quite throughout this range.

EXAMPLE 57

A conductive phase for resistors was made in accordance with the second aspect of the invention as follows:

An admixture of finely divided particles containing 26.78 g of SnO, 43.94 g $Ta_2O_5$, and 429.28 g of $SnO_2$ was ball milled for one hour in distilled water as the liquid milling medium. The milled admixture was oven dried at 100° C. The dried admixture was then placed in aluminum crucibles and heated to 875° C. in a nitrogen atmosphere for about 24 hours. Upon cooling, the fired composition was Y-milled for six hours, again using distilled water as the liquid milling medium. The milled composition was then oven dried at about 100° C.

EXAMPLES 58–60

Preparation of Thick Film Compositions: A series of three screen-printable thick film pastes was prepared by dispersing an admixture of the conductive phase of Example 57, $SnO_2$ and glass in 26% by wt. organic medium in the manner described above.

Evaluation of Compositions: Each of the three thick film pastes was used to form a resistor film in the manner described above and the fired films were evaluated with respect to average resistance, coefficient of variance and hot temperature coefficient of resistance. The composition of the solids content of the pastes and the electrical properties of the resistors therefrom are given in Table 9 below.

TABLE 9

| Low-end Pyrochlore-based Resistors | EXAMPLE NO. | | |
|---|---|---|---|
| | 58 | 59 (% wt. solids) | 60 |
| Component | | | |
| Conductive phase, Ex. 57 | 38.95 | 38.95 | 38.95 |
| $SnO_2$ | 28.67 | 28.67 | 28.67 |
| Glass VIII | 29.08 | — | 16.09 |
| Glass IX | — | 29.08 | 12.98 |
| Glass IV | 2.98 | 2.98 | 2.98 |
| $CaF_2$ | 0.32 | 0.32 | 0.32 |
| Resistor Properties | | | |
| $R_{av}$ (kΩ/□) | 32.3 | 59.2 | 38.8 |
| CV (%) | 1.9 | 3.7 | 2.7 |
| HTCR (ppm/°C.) | −35 | +21 | −7 |

The data in Table 9 again show the use with the invention of different glasses to control average resistance and HTCR. All three of these low-end resistors had quite low coefficients of variance.

EXAMPLES 61–65

Preparation of Thick Film Compositions: A series of five screen-printable thick film pastes was prepared by dispersing an admixture of the conductive phase of Example 57, the niobium-based conductive phase of Examples 39–45, $SnO_2$ and glass in 25% organic medium in the manner described hereinabove.

Evaluation of Compositions: Each of the five thick film pastes was used to form a series of resistor films in the manner described hereinabove and the fired films were evaluated with respect to average resistance, coefficient of variance and hot temperature coefficient of resistance. The composition of the resistor pastes and the electric properties of the resistors therefrom are given in Table 10, which follows:

TABLE 10

| 30 KΩ/□ - 30 MΩ/□ Resistors Containing Niobium-based Pyrochlore as TCR Driver | EXAMPLE NO. | | | | |
|---|---|---|---|---|---|
| | 61 | 62 | 63 (% wt. solids) | 64 | 65 |
| Component | | | | | |
| Ta-based Conductive Phase, Ex. 57 | 38.95 | 67.62 | 37.82 | 66.86 | 64.19 |
| Ta-based Conductive Phase, Ex. 46 | — | — | 27.01 | — | — |
| Nb-based Conductive Phase | — | 0.68 | 2.70 | 0.41 | — |
| $SnO_2$ | 28.67 | — | — | — | — |
| Glass VIII | 29.08 | 7.44 | — | — | — |
| Glass IV | 2.98 | 2.98 | 2.97 | 2.97 | 3.24 |
| Glass IX | — | 20.96 | — | — | — |
| Glass III | — | — | 29.17 | — | — |
| Glass II | — | — | — | 29.44 | 32.57 |
| $CaF_2$ | 0.32 | 0.32 | 0.32 | 0.32 | — |
| Resistor Properties | | | | | |
| $R_{av}$ (kΩ/□) | 30.8 | 92.2 | 1079 | 8,953 | 31,043 |
| CV (%) | 3.3 | 3.9 | 8.9 | 8.8 | 6.1 |
| HTCR (ppm/°C.) | −51 | +65 | +135 | +115 | +40 |

The data in Table 10 show once again the capability of the invention for making a full range of resistors over the range from 30 KΩ/□ through 30 MΩ/□. The data show also the capability of the niobium-containing pyrochlore and conductive phase made therefrom to adjust HTCR.

EXAMPLES 66–80

A. Pyrochlore Preparation

A series of fifteen different pyrochlore compositions was prepared in accordance with the first aspect of the invention. Each of the pyrochlores was prepared by formulating an admixture of the powders of each component which was slurried in acetone and then dried in air. After air drying, the admixture was milled and placed in an alumina crucible in which it was heated in a nitrogen furnace at 900° C.±20° C. for 24 hours. After 24 hours, the furnace power was turned off and the fired pyrochlore was cooled slowly in the furnace in the presence of a nitrogen atmosphere.

B. Evaluation

Each of the fifteen pyrochlores was examined by X-ray diffraction using a Norelco diffractometer with CuKα radiation to determine the number of solid phases present therein. The composition and phase data for each of the pyrochlores is given in Table 11 below.

In addition, the pyrochlores of Examples 66, 67, 71, 72 and 73 were examined with respect to intensity (I), H, K and L Miller indices and D-value using a Guinier camera. Cell dimensions were refined by the least squares method using the H gg-Guinier data. The cell parameters therefrom are given Table 12 below.

TABLE 11

Pyrochlore Phase Data

| Ex. | Composition (Molar) SnO | $SnO_2$ | $Ta_2O_5$ | Formula Values(1) X | $Y_3$ | $Y_1$ | Solid Phase(s) |
|---|---|---|---|---|---|---|---|
| 66 | 2.00 | — | 1.00 | 0 | 2.00 | 0 | (2) + (3) |
| 67 | 2.00 | 0.25 | 1.75/2 | 0 | 1.75 | 0.25 | (2) + (3) |
| 68 | 2.00 | 0.50 | 1.50/2 | 0 | 1.50 | 0.50 | (2) + (4) |
| 69 | 2.00 | 0.75 | 1.25/2 | 0 | 1.25 | 0.75 | (2) + (4) |
| 70 | 1.50 | 1.00 | ½ | 0.5 | 1.00 | 1.00 | (2) + (4) |
| 71 | 1.75 | — | 1.00 | 0.25 | 2.00 | 0 | (2) |
| 72 | 1 65 | — | 1 00 | 0 35 | 2.00 | 0 | (2) |
| 73 | 1.55 | — | 1.00 | 0.45 | 2.00 | 0 | (2) |
| 74 | 1.75 | 0.25 | 1.75/2 | 0.25 | 1.75 | 0.25 | (2) |
| 75 | 1.75 | 0.35 | 1.65/2 | 0.25 | 1.65 | 0.35 | (2) + (4) |
| 76 | 1.75 | 0.45 | 1.55/2 | 0.25 | 1.55 | 0.45 | (2) + (4) |
| 77 | 2.00 | 0.45 | 1.55/2 | 0 | 1.55 | 0.45 | (2) |
| 78 | 1.65 | 0.25 | 1.75/2 | 0.35 | 1.75 | 0.25 | (2) + (4) |
| 79 | 1.65 | 0.45 | 1.55/2 | 0.35 | 1.55 | 0.45 | (2) + (4) |
| 80 | 1.65 | 0.45 | 1.55/2 | 0.35 | 1.55 | 0.45 | (2) + (4) |

(1) $Sn^{2+}_{2-x}Ta_{y3}Sn^{4+}_{y1}O_{7-x-y1/2}$
(2) Pyrochlore
(3) Sn trace
(4) $SnO_2$ The X-ray diffraction data above show that in all cases the tantalum was totally tied up in the pyrochlore structure and there was no free $Ta_2O_5$. In all of the examples, no more than two solid phases were observed and in each instance in which no $SnO_2$ was present, there was only a single pyrochlore phase present. Single phase product was also obtained from Example 77 and Examples 66 and 67 exhibited only very small quantities of a second phase which appeared to be tin metal.

In the firing of the pyrochlore components, a commercial grade of nitrogen gas was used. Because commercial grade nitrogen contains trace amounts of oxygen, it is possible that a minute amount of the SnO in each formulation may have been oxidized to $SnO_2$. Thus, the composition of the pyrochlore as shown by the Formula Values in Table 11 are theoretical and the actual values of X and $Y_3$ may be respectively slightly lower and higher than shown.

TABLE 12

Pyrochlore Cell Parameters

| Example No. | Cell Parameter (Å) |
|---|---|
| 66 | 10.5637 ± 0.0002 |
| 67 | 10.5851 ± 0.0003 |
| 71 | 10.5589 ± 0.0004 |
| 72 | 10.5559 ± 0.0004 |
| 73 | 10.5525 ± 0.0004 |

The foregoing cell parameters show that the pyrochlore structure itself is cubic. The X-ray diffraction studies revealed excellent agreement between calculated and observed D-values.

It is interesting to note that the pyrochlore compositions of the invention tend to have a distinctive color which is related to the composition of the pyrochlore. For example, in Examples 66-70 in which the $SnO_2$/$Ta_2O_5$ ratio was progressively increased, the visible pyrochlore color ranged as follows:

| Example No. | Color |
|---|---|
| 66 | Tan |
| 67 | Cream |
| 68 | Yellow |
| 69 | Yellow, green tint |
| 70 | Pale green |
| 71 | Yellowish green |

Furthermore, the niobium-containing pyrochlores, such as those of Examples 39-45, had sufficiently bright yellow coloring that they can be used as pigments in many applications in which yellow lead pigments might otherwise be used. On the other hand, some of the pyrochlores are quite free of color and can be used to produce very white thick films.

EXAMPLES 81-86

Preparation of Thick Film Compositions: A series of six screen-printable thick film compositions was formulated from the pyrochlores of Examples 66, 67, 71, 72 and 73 by mixing each with $SnO_2$ and then dispersing the admixture in 26% wt. organic medium in the manner described above. Each of the six thick film compositions was used to form a series of resistors in the manner described above and the fired films were evaluated with respect to average resistance, coefficient of variance and hot temperature coefficient of resistance. The composition and electrical properties of each series of resistor compositions are given in Table 13 below.

TABLE 13

Use of Various Pyrochlores in Thick Film Resistors

| | EXAMPLE NO. 81 | 82 | 83 (% wt. solids) | 84 | 85 | 86 |
|---|---|---|---|---|---|---|
| Component | | | | | | |
| Pyrochlore Ex. 66 | 13.51 | — | — | | | |
| Pyrochlore Ex. 67 | — | 13.51 | | | | |
| Pyrochlore Ex. 68 | — | — | 13.51 | | | |
| Pyrochlore Ex. 71 | — | — | — | 13.51 | | |
| Pyrochlore Ex. 72 | — | — | — | | 13.51 | — |
| Pyrochlore Ex. 73 | — | — | — | — | — | 13.51 |
| $SnO_2$ | 54.05 | 54.05 | 54.05 | 54.05 | 54.05 | 54.05 |
| Glass IX | 32.43 | 32.43 | 32.43 | 32.43 | 32.43 | 32.43 |
| Resistor Properties | | | | | | |
| $R_{av}$ (kΩ/□) | 61.27 | 55.12 | 50.02 | 54.29 | 46.36 | 41.14 |
| CV (%) | 5.4 | 2.4 | 2.4 | 5.5 | 5.4 | 3.1 |
| HTCR (ppm/°C.) | +234 | +225 | −15 | +185 | +144 | −15 |

The above data show that the full range of pyrochlore compositions with which the invention is concerned can be used to make thick film resistors having a wide range of resistance and HTCR properties, each having quite low CV properties as well.

EXAMPLES 87-89

Preparation of Thick Film Compositions: A series of three screen-printable thick film compositions was formulated by admixing the conductive phase of Example 2 with inorganic binder in 26% wt. organic medium in the manner described above. Three different glass combinations contain four different glasses and $CaF_2$ were used as the primary inorganic binder.

Evaluation of Compositions: Each of the three thick film compositions was used to form a series of resistors in the manner described above and the fired resistors were evaluated with respect to average resistance, coefficient of variance and hot temperature coefficient of resistance. The composition of the pastes and the electrical properties of each series of resistors therefrom are given in Table 14, which follows:

TABLE 14

90 KΩ/□ - 9 MΩ/□ Resistors Based on Pyrochlore-containing Conductive Phase

| | EXAMPLE NO. 87 | 88 (% wt. solids) | 89 |
|---|---|---|---|
| Component | | | |
| Conductive phase, Ex. 2 | 64.86 | 62.16 | 60.77 |
| Glass II | — | — | 35.24 |
| Glass III | — | 22.86 | — |
| Glass IV | 3.27 | 3.51 | 3.65 |
| Glass VIII | 31.54 | 12.00 | — |
| $CaF_2$ | 0.32 | 0.32 | 0.32 |
| Resistor Properties | | | |
| $R_{av}$ (kΩ/□) | 92 | 930 | 9189 |
| CV (%) | 4.9 | 7.2 | 10.9 |
| HTCR (ppm/°C.) | +3 | +125 | +180 |

The above data show the use of the Example 2 conductive phase to produce resistors having a resistance span of two orders of magnitude, all of which had quite satisfactory CV values and good positive HTCR values.

EAMPLES 90–93

A commercially available thick film resistor composition TRW TS105[(1)] was compared with the thick film composition of Example 87 by preparing a series of resistors from each material on two different substrates by the procedure outlined hereinabove. Each of the resistors was evaluated for average resistance, coefficient of variance and both hot and cold temperature coefficients of resistance. These data are given in Table 15 below.

TABLE 15

Effect of Substrate-Comparison of TRW TS 105 and Ex. 87 Thick Film Compositions

| | EXAMPLE NO. 90 | 91 | 92 | 93 |
|---|---|---|---|---|
| Thick Film Composition | TRW TS 105[(1)] | | Ex. 87 | |
| Substrate | 4275[(2)] | $Al_2O_3$ | 4275[(2)] | $Al_2O_3$ |
| Resistor Properties | | | | |
| $R_{av}$ (kΩ/□) | 1380 | 281 | 45 | 80 |
| CV (%) | 34 | 50 | 6 | 4 |
| HTCR (ppm/°C.) | −4550 | −2830 | −8 | −22 |
| CTCR (ppm/°C.) | −11,000 | −6900 | −4 | +4 |

[(1)]Product name of TRW, Inc., Cleveland, OH 44117.
[(2)]Product name of E. I. du Pont de Nemours and Company, Inc., Wilmington, DE 19898.

The above data show that the TS 105 material was very sensitive to the change in substrate material and extremely sensitive to processing conditions as shown by the very high HTCR and CTCR. Moreover, the CV values of the TS 105 material were too high. By comparison, the Ex. 87 composition exhibited only comparatively minor variations in properties on the two substrates and, as shown by the very low HTCR and CTCR values, had quite broad processing latitude. In addition, CV values were both acceptable.

EXAMPLES 94–97

The above-referred commercially available thick film resistor composition (TRW TS 105) was compared with the thick film composition of Examples 87–89 by preparing a series of resistors from each of them. All the resistors were fired at 900° C. unless otherwise indicated. Each of the three series was divided into three parts for evaluation of post laser trim stability after 1000 hours at room temperature (20° C.), 150° C. and at 40° C. and 90% relative humidity. Each resistor measured 40×40 mm and was trimmed with a plunge cut. The untrimmed stability of the resistors of Examples 94–96 was also obtained. The above-described post laser trim stability data are given in Table 16 below. The % change in resistance is indicated by "$X_{av}$" and the standard deviation of each set of measurements by the term "s".

TABLE 16

1000 Hour Post Laser Trim Stability

| Ex. No. | Thick Film Composition | | Aging Conditions 20° C. | 150° C. | 40° C./ 90% RH |
|---|---|---|---|---|---|
| 94 | Ex. 87 | Trimmed $X_{av}$ | 0.41 | 0.93 | 1.18 |
| | | Trimmed s | 0.07 | 0.09 | 0.15 |
| | | Untrimmed $X_{av}$ | 0.06 | 0.41 | 0.52 |
| | | Untrimmed s | 0.03 | 0.14 | 0.20 |
| 95 | Ex. 88 | Trimmed $X_{av}$ | 0.52 | 1.00 | 1.40 |
| | | Trimmed s | 0.39 | 0.20 | 0.45 |
| | | Untrimmed $X_{av}$ | 0.05 | 0.54 | 0.46 |
| | | Untrimmed s | 0.07 | 0.27 | 0.13 |
| 96 | Ex. 89 | Trimmed $X_{av}$ | 0.53 | 1.20 | 1.70 |
| | | Trimmed s | 0.36 | 0.40 | 0.75 |
| | | Untrimmed $X_{av}$ | 0.22 | 0.42 | 1.11 |
| | | Untrimmed s | 1.3 | 0.22 | 0.88 |
| 97 | TS 105 | Trimmed[(2)]$X_{av}$ | −15.6 | −5.6 | −14.7 |
| | | Trimmed[(2)]$X_{av}$ | −7.3 | −7.0 | −8.5 |
| 98 | TS 105[(1)] | Trimmed[(2)]$X_{av}$ | 0.10 | 1.3 | 2.1 |
| | | Trimmed s | 0.3 | 0.2 | 0.6 |

[(1)]Fired at 1000° C.
[(2)]Untrimmed stability not obtained

The above data show that the pyrochlore-containing pastes of the invention produce resistors which are much less temperature sensitive and much more resistant to high humidity, high temperature conditions.

I claim:

1. A method for making pyrohlore-related compounds corresponding to the formula $$Sn_{2-x}^{2+}Ta_{y3}Nb_{y2}Sn_{y1}^{4+}O_{7-x-y1/2}$$

wherein
x=0–0.55
$y_3$ =0–2
$y_2$ =0–2
$y_1$ =0–0.5 and
$y_1+y_2+y_3=2$,
which comprises firing in a nonoxidizing atmosphere a stoichrometric admixture of finely divided particles of SnO, $SnO_2$ and a metal pentoxide selected from the group consisting of $Ta_2O_5$, $Nb_2O_5$ and mixtures thereof, at a temperature of at least 500° C.

* * * * *